United States Patent [19]

Roche

[11] 4,379,118
[45] Apr. 5, 1983

[54] PROCESS FOR MEASURING A CONTINUOUS NEUTRON FLUX AND MEASURING APPARATUS FOR CARRYING OUT THIS PROCESS

[75] Inventor: Michel Roche, Dijon, France

[73] Assignee: Commissariat a l'Energie Atomique, Paris, France

[21] Appl. No.: 186,427

[22] Filed: Sep. 12, 1980

[30] Foreign Application Priority Data

Sep. 21, 1979 [FR] France .................. 79 23514

[51] Int. Cl.³ ............................. G21C 17/00
[52] U.S. Cl. .................... 376/154; 376/254; 250/390; 250/391
[58] Field of Search ........... 250/390, 391, 392; 376/154, 245, 247, 254, 255

[56] References Cited

U.S. PATENT DOCUMENTS

| | | | |
|---|---|---|---|
| 2,993,138 | 7/1961 | Scott, Jr. ........................... | 376/154 |
| 3,163,759 | 12/1964 | Cordy et al. ...................... | 376/154 |
| 3,226,547 | 12/1965 | Bloom ................................ | 250/390 |
| 3,226,548 | 12/1965 | Hauser et al. ..................... | 250/390 |

FOREIGN PATENT DOCUMENTS

| | | | |
|---|---|---|---|
| 1764145 | 5/1971 | Fed. Rep. of Germany ...... | 250/390 |
| 1344326 | 2/1964 | France .............................. | 250/390 |
| 1354110 | 6/1964 | France .............................. | 250/390 |

Primary Examiner—Sal Cangialosi

[57] ABSTRACT

The invention relates to a process for measuring a continuous neutron flux, and to an measuring apparatus for carrying out this process. According to the invention, a probe is disposed in the neutron flux, comprising a first part defining an enclosure and a second part disposed inside the enclosure and separated therefrom by a medium whose heat conductance is known, one of said parts being made at least partially of fissile material, and the difference in temperatures between the two parts is measured at equilibrium, to deduce therefrom the power released by the fissile material, then the neutron flux. The invention is more particularly applicable to measuring the neutron flux, particularly in the core of nuclear reactors.

9 Claims, 7 Drawing Figures

PROCESS FOR MEASURING A CONTINUOUS NEUTRON FLUX AND MEASURING APPARATUS FOR CARRYING OUT THIS PROCESS

The invention relates to a process for measuring a continuous neutron flux, as well as to a measuring apparatus for carrying out this process.

Numerous devices exist for measuring neutron fluxes. These devices generally employ nuclear reactions producing the emission of particles ($\alpha$ or $\beta$ radiations, fission fragments, etc.) which are converted into electric signals, either by measuring the rate of charge or by ionizing an appropriate gas of which the conductivity is measured continuously or in pulsed manner. Among the devices coming in the latter category, particular mention will be made of counters employing boron trifluoride ($BF_3$) and fission chambers.

In the particular case of measurements of very high flux, such as the measurements carried out in the core of nuclear reactors, the measuring means are highly reduced and are virtually limited to continuously running fission chambers.

From the known neutron flux measuring devices, none enables the specific power released to be measured directly, although this power constitutes a fundamental parameter for the management of the core of nuclear reactors. In addition, the devices employing nuclear reactions require the knowledge of the neutron spectrum. Finally, in the case of a fission chamber, it is necessary to standardize the chamber and the presence of the gamma radiation is highly disturbing.

Furthermore, it is known to measure intense pulsed neutron fluxes by using fissile resistors previously calibrated in an oven. To this end, the resistor is placed in the neutron flux and the resistance thereof is measured in order to deduce the temperature therefrom. It is then possible to calculate the corresponding number of fissions, on condition that the fissile resistor is subjected to a neutron pulse of sufficiently short duration for the resistor to be considered as being thermally insulated. The technique used is that of adiabatic calorimetry, since the heat exchanges are considered as zero due to the rapidity of measurement. Such a process of measurement is described in the article by Messrs. M. Roche, J. Morin, E. Poussier, G. Cottin and J. David of the Commissariat a l'Energie Atomique, entitled: "Use of fissile resistors for measuring intense pulsed neutron fluxes", published in the journal "Nuclear Instruments and Methods" 159 (1979), pages 439 to 447.

As has just been seen, the process of measurement described in this article uses the technique of adiabatic calorimetry rendered possible by the rapidity of measurement in the case of the pulsed neutron fluxes (of duration less than 1/10th of a second). However, this process cannot be applied to the measurement of continuous neutron fluxes, such as that effected in the core of nuclear reactors, as the heat exchanges cannot then be considered as zero. The process does not enable the specific power released to be measured either.

It is an object of the present invention to provide a process for measuring continuous neutron fluxes enabling very high flux measurements to be carried out, such as those which are to be made in the core of nuclear reactors by effecting an absolute measurement of the power released, i.e. directly and precisely, without it being necessary to know the neutron spectrum. It is also an object of the invention to provide an apparatus for carrying out this process.

To this end, it is proposed to employ the technique of "flux" calorimetry which, contrary to the technique of adiabatic calorimetry, does not seek to annul the leakage flux, but, on the contrary to use it for measuring the power released at equilibrium by the calorimeter. It is also proposed to use the teachings of the above-mentioned article to effect the measurement of temperature by measuring the electrical resistance of a hot source constituted by a fissile resistor or by an inert resistor heated indirectly by a foil of fissile material, this resistor having been previously calibrated. Due to the use of the flux calorimetry, it is no longer necessary that the electrical resistor be thermally insulated, since, on the contrary, this absence of insulation is used for effecting the measurement. It is therefore possible to measure the continuous neutron fluxes in this way with an apparatus whose response time is excellent due to the measurement of temperature by measuring an electrical resistance.

The invention thus proposes a process for measuring a continuous neutron flux, comprising the steps of:
disposing in the neutron flux a probe comprising a first part defining an enclosure and a second part disposed inside the enclosure and constituted by an electrical resistor previously calibrated in order to know the variation thereof as a function of the temperature, the electrical resistor being separated from the enclosure by a medium whose heat conductance is known and one of said parts being made at least partially of a fissile material whilst the other part is made of inert material,
measuring said electrical resistor to know the temperature of the second part and measuring the temperature of the first part of the probe, and
deducing from the difference in the temperatures measured at equilibrium between the two parts of the probe and the corresponding value of the heat conductance of the medium, the power continuously released by the part made of fissile material.

The process of measurement according to the invention therefore uses a flux calorimetric method, in which the rise in temperature of a fissile resistor receiving a burst of neutrons is not measured, as in the above-mentioned article, but the difference in temperature existing at equilibrium between a fissile part and an inert part placed in a continuous neutron flux. It therefore enables a continuous neutron flux to be measured directly by means of a calorimeter with controlled leakages, by thermal conduction of the heat preferably coming from a fissile resistor.

According to a first variant embodiment of the invention, a second electrical resistor, previously calibrated in order to know the variation thereof as a function of the temperature, may then be electrically connected to the enclosure and offset axially with respect to the fissile material, so that this second resistor is measured to know the temperature of the enclosure.

According to a second variant embodiment of the invention, the variations in temperature of the enclosure are corrected by associating with the electrical resistor a correction device such as a thermistance, sensitive to the temperature of the enclosure.

The invention also relates to an apparatus for measuring a neutron flux according to this process, said apparatus comprising a probe comprising a first part defining an enclosure, and a second part disposed inside the enclosure and constituted by an electrical resistor, this resistor being separated from the enclosure by a medium whose heat conductance is known, and means for measuring the difference in temperatures between the two parts of the probe, these means comprising means for measuring the value of said resistor.

The invention will be more readily understood on reading the following description with reference to the accompanying drawings, in which.

Figure 1:
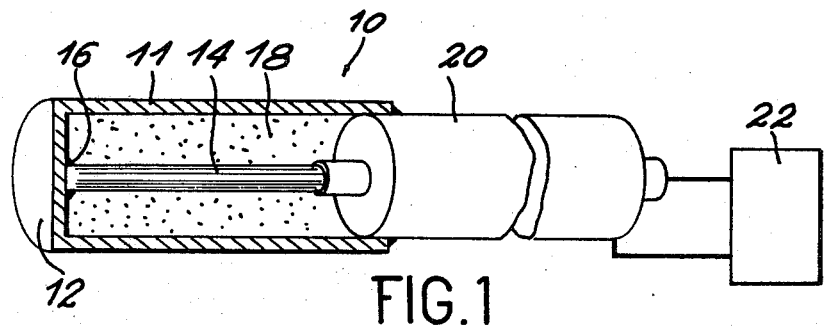
FIG. 1 is a schematic view in longitudinal section of an apparatus for measuring a continuous neutron flux, made in accordance with the teachings of the present invention.

Referring now to the drawings, the device for measuring the continuous neutron flux shown in FIG. 1 comprises a probe 10 and measuring means 22. The probe 10 comprises an enclosure 11, preferably tubular in form, closed at one of its ends by a wall 12 and at its other end by a coaxial cable 20. The enclosure 11 is made of a material which is a good conductor of electricity and inert, such as a non-fissile metal. A fissile resistor, taking the form of a wire 14 in the embodiment described, is disposed inside the enclosure 11, preferably coaxially with respect thereto and electrically connected to the wall 12, for example by a weld 16. The wire 14 is preferably made of a metal alloy including a more or less high content of fissile material such as uranium. Of course, the wire 14 may be replaced by any other element made of fissile material such as a ceramic pellet made for example of oxide or carbide of fissile material.

The wire 14 is separated from the enclosure 11 by a medium 18 which constitutes an electrical insulating means and whose heat conductivity determines the sensitivity of the probe 10. The medium 18 is also chosen, taking into account other criteria such as mechanical strength, resistance to pressure or temperature, resistance to radiations, etc. In practice, and by way of example, the medium 18 may be constituted by alumina when it is desired to make a device of low sensitivity and by a vacuum when it is desired to make a very sensitive device.

The internal conductor of the coaxial cable 20 electrically connects the wire 14 to the measuring means 22, whilst the outer conductor of this cable electrically connects the enclosure 11 to the measuring means 22. The latter are intended to measure the resistance of the wire 14 and they may be constituted to this end by an ohm-meter 22. The electrical circuit thus formed comprises a source of current, the resistor constituted by the wire 14 and means for displaying the value of this resistor.

Before proceeding with the actual measurement, the variation of the resistance R of the wire 14 as a function of its temperature $\theta$ is determined by a static calibration, by placing it in an oven.

Figure 2:
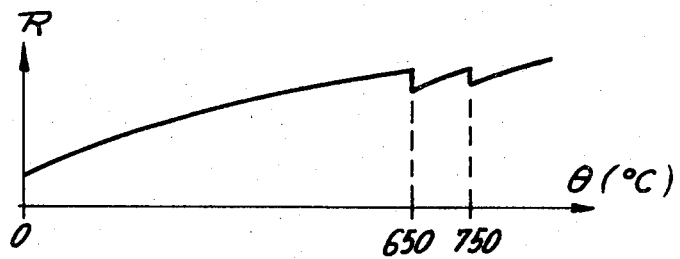
FIG. 2 is a curve drawn up by calibration and representing the variations of the fissile resistor of the device shown in FIG. 1 as a function of the temperature.

FIG. 2 shows a scale curve of this type, in the case of the wire 14 being constituted by an alloy of uranium with 0.2% of vanadium. The discontinuities appearing on this curve at about 650° C. and 750° C. correspond to the changes of crystalline phase.

When the measuring probe 2 according to the invention is placed in a neutron flux, the fissions resulting therefrom in the wire 14 raise the temperature $\theta$ of this wire which thus becomes greater than the temperature $\theta_O$ of the enclosure 11, this temperature $\theta_O$ being substantially equal to that of the ambient medium. If the heat conductance of the medium 18 is designated by C, the power W released in the fissile resistor by the fissions created therein by the incident neutrons, is expressed at equilibrium by the relation:

$$W = C(\theta - \theta_O) \quad (I)$$

In practice, this relation must be corrected in order to take into account the superficial energy loss due to the fission products which leave the fissile medium on the periphery of the wire and deposit their energy in the medium 18. This correction depends both on the nature of the medium 18 and the characteristics of the wire 14. It is generally about 5% for a wire with a diameter of 0.1 mm and a resistance of a few ohms, whose length is a few centimeters, this wire being placed in vacuo.

Figure 3:
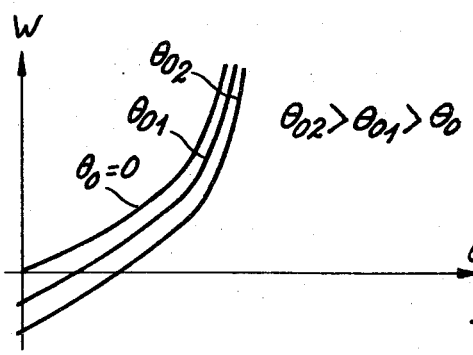
FIG. 3 is a scale curve showing the variations of the power released by the fissile resistor of the device shown in FIG. 1 as a function of the temperature of this resistor, drawn up for different values of the temperature of the outer enclosure.

As shown in FIG. 3, the variations of the power W as a function of the temperature $\theta$ may be determined by calibration in the laboratory for different values of the temperature $\theta_O$ of the enclosure 11.

Figure 4:
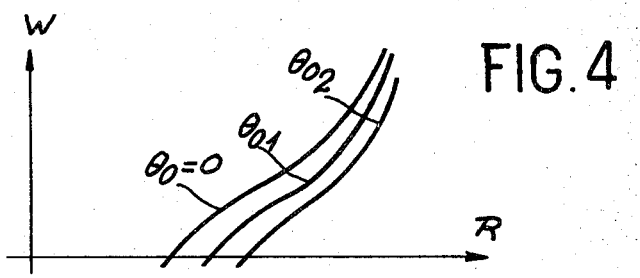
FIG. 4 is a curve deduced from the curves of FIGS. 2 and 3 and representing the variations in the power released by the fissile resistor as a function of the value of this resistance for different values of the temperature of the outer enclosure of the device.

From the two thermal calibrating curves of FIGS. 2 and 3, the curves of variations of the power W released by the wire as a function of the resistance R of this wire, for different values of the temperature $\theta_O$ of the enclosure, may be established, as shown in FIG. 4.

In the embodiment of the invention shown in FIG. 1, the actual measurement is effected by placing the probe 10 in the continuous neutron flux which it is desired to measure, i.e. for example in the core of a nuclear reactor. The temperature $\theta_O$ of the enclosure 10 or of the ambient medium is measured by means of a conventional measuring device (not shown) such as a thermometer or a thermocouple. The curve of variation of the power W as a function of the resistance R corresponding to this temperature $\theta_O$ is then determined in FIG. 4. When the neutron flux is substantially constant, a thermal equilibrium is established so that the resistance R of the wire 14 measured by means of the ohm-meter 22 is stabilized. It is then possible, due to the curve of FIG. 4, to deduce the value of the power W released by the wire 14 immediately.

Of course, the curves shown in FIGS. 2, 3 and 4 are in no way limiting. The ohm-meter 22 may be graduated directly in temperatures in the course of a prior calibration. The curves of FIGS. 2 and 4 then become unnecessary. The value of the temperature displayed by the ohm-meter 22 may also be used for directly calculating the value of the power released by the wire from the relation (I) mentioned above. The heat conductance C of the medium 18 is then determined beforehand, for example by calibration.

Figure 5:
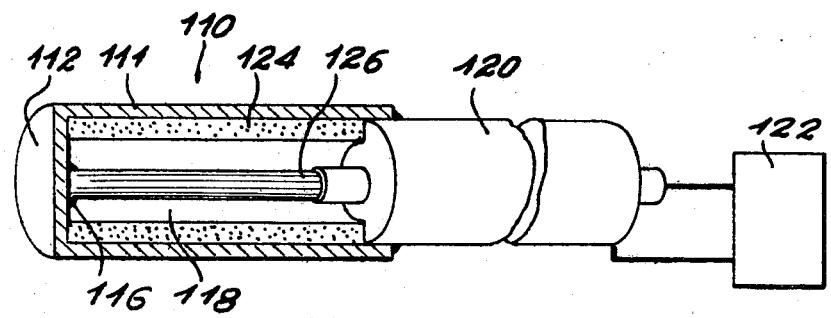
FIG. 5 is a view similar to FIG. 1, showing a variant of the measuring device according to the invention.

In the variant embodiment shown in FIG. 5, the apparatus for measuring neutron flux differs from the apparatus shown in FIG. 1 by the structure of the probe. More precisely, the probe 110 of the measuring apparatus shown in the FIG. 5 comprises an enclosure 111, of tubular shape, closed at one of its ends by a wall 112 and at its other end by a coaxial cable 120. A foil of fissile material 124 is wound inside the tubular part of the enclosure 111.

An inert resistor 126 is disposed coaxially inside the enclosure 111 and the foil 124, and it is connected at one of its ends, for example by a weld 116, to the wall 112 of the enclosure 111. As in the embodiment shown in FIG. 1, an electrically insulating medium 118 is disposed between the foil 124 and the inert resistor 126. The inner conductor of the coaxial cable 120 connects the resistor 126 to an ohm-meter 122, and the outer conductor of the cable 120 connects the enclosure 111 to the ohm-meter 122 so as to define a closed measuring circuit.

Calibration of the apparatus shown in FIG. 5 and the actual measurement are effected in the same manner as for the apparatus shown in FIG. 1. The only difference between these variant embodiments lies in the fact that the resistor 126 is heated indirectly by the fissile material through the medium 118. The intermediate medium 118 performs, as before, the function of heat conduction and the fission products must pass easily therethrough. For this reason, an inert gas or a vacuum will be preferably chosen.

The variant embodiment of FIG. 5 has certain technical advantages over the variant of FIG. 1. These advantages are associated with the disconnection of the functions of resistance and of fission. It is thus possible to avoid the problem raised by the changes of crystalline phase and to improve the linearity and dynamics of the apparatus.

The temperature $\theta$ of the resistor 126 which is measured as hereinabove by means of the ohm-meter 122 is connected to the temperature $\theta_U$ which a fissile resistor of specific heat $C_U$ made of heavy material, tungsten, tantalum, platinum, etc. would have, by the relation:

$$\theta = C_U/C \times \theta_U \qquad (2)$$

where C designates the specific heat of the inert resistor.

This relation, strict for a resistor of zero thickness, must be corrected by adding to the temperature $\theta$ measured a quantity $\Delta\theta$ which is variable according to the geometry of the probe and the thickness of the resistor. In practice, for this quantity to be able to be calculated, the thickness of the resistor must be very small and the geometry of the probe must be as simple as possible. To this end, a probe of cylindrical or plane geometry will preferably be chosen.

In the two variant embodiments shown in FIGS. 1 and 5, the temperature of the enclosure of the measuring probe is measured separately by means of a conventional device (not shown). On the contrary, in the variant embodiment shown in FIG. 6, the temperature of the enclosure is also measured by the probe, so that the measuring apparatus may directly display the difference of the temperatures between the resistor and the enclosure.

Figure 6:
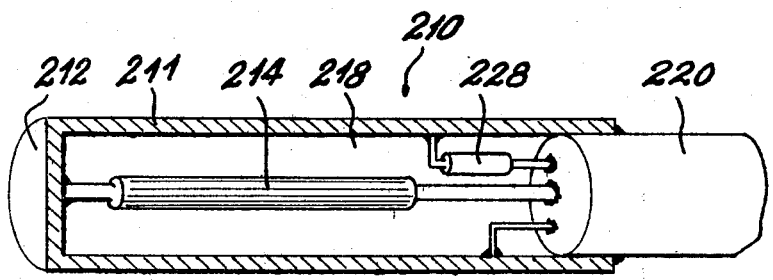
FIG. 6 is a view comparable to FIGS. 1 and 5 and showing another variant of the measuring device according to the invention.

The probe 210 shown in FIG. 6 is of the same type as the probe shown in FIG. 1, i.e. it is composed of an inert metal enclosure 211 of cylindrical form, closed at its two opposite ends by a partition 212 and by a coaxial cable 220 connecting the probe to measuring means (not shown) such as an ohm-meter. A fissile resistor 214 is disposed coaxially inside the enclosure 211 and electrically connected by its two ends respectively to the partition 212 and to the inner electrical conductor of the coaxial cable 220. The outer conductor of the cable 220 is electrically connected to the enclosure 211. Finally, an electrically insulating intermediate medium 218 is disposed between the enclosure 211 and the resistor 214.

In accordance with the variant embodiment of FIG. 6, an inert resistor 228 is also disposed inside the enclosure 211 and electrically connected to the cylindrical wall thereof and to a second inner electrical conductor of the coaxial cable 220. The resistor 228 is offset axially with respect to the fissile resistor 214, so that the heat diffused substantially radially by the latter under the effect of the fissions provoked by the incident neutron flux has no direct consequence on the temperature of the resistor 228.

Due to the measuring device shown in FIG. 6, it is possible, as in the case of the device shown in FIG. 1, to measure the value of the fissile resistor 14 or the corresponding temperature $\theta$ directly by means of an ohm-meter. Moreover, this device enables the value of the inert resistor 228 or the corresponding temperature $\theta_O$ of the enclosure 211 to be measured simultaneously. In order to facilitate measurement, it is possible, by means of an appropriate assembly, to display the difference between the temperatures $\theta$ of the fissile resistor and $\theta_O$ of the enclosure, directly on the ohm-meter.

Figure 7:
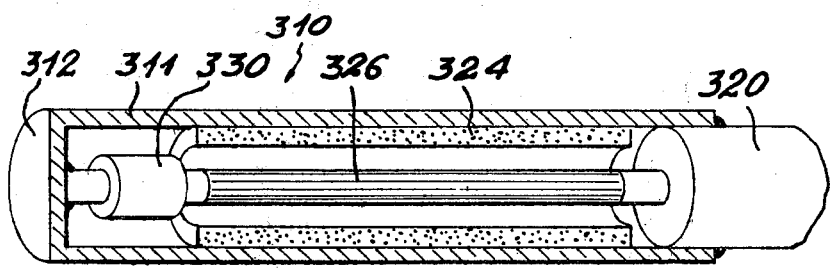
FIG. 7 is a view comparable to FIGS. 1, 5 and 6 and showing a further variant of the measuring device according to the invention.

In the variant embodiment shown in FIG. 7, the measurement of the temperature $\theta_O$ of the enclosure is eliminated. In fact, any variation of this temperature is automatically corrected. The variations of the temperature measured correspond to the variations of the difference in temperature between the resistor and the enclosure.

To this end, the device 310 shown in FIG. 7, which moreover is substantially of the same type as the device shown in FIG. 5, comprises a thermistance 330 disposed in series with the inert resistor 326 between it and the end wall 312 of the enclosure 311. In this case, and as illustrated in FIG. 7, the foil of fissile material 324 is disposed inside the tubular part of the enclosure 310 opposite the inert resistor 326, but does not extend in the radial part of the enclosure 310 surrounding the thermistance 330.

Due to the law of variation of the thermistance 330 as a function of the temperature $\theta_O$ of the enclosure 311, the assembly of FIG. 7 enables a real correction of the variations of this temperature $\theta_O$ to be made, so that the simple measurement of the total resistance of the wire 326 and of the thermistance 330 enables the power dissipated by the fissile material to be deduced therefrom.

Of course, the invention is not limited to the different variants which have just been described by way of example. In particular, the invention covers all processes for measuring a continuous neutron flux in which the power released by the fissile material is deduced from the measurement of a difference in temperature between a fissile material placed in the neutron flux and an inert material separated from the fissile material by an intermediate medium of which the heat conductance is known, the measurement of the two temperatures or of the difference in temperatures being effected by means of previously calibrated resistors (the rapidity of response of the measuring apparatus to resistance, such as those which have just been described, is much greater than that of the majority of the other known temperature measuring devices). However, the cylindrical configuration of the measuring apparatus described could be replaced by a plane configuration. Finally, any known electronic device may be used for measuring the value of the resistances and for electronically correcting the variations of ambient temperature $\theta_O$.

I claim:

1. Process for measuring a continuous neutron flux, comprising the steps of:

disposing in the neutron flux a probe comprising a first part defining an enclosure and a second part disposed inside the enclosure and constituted by an electrical resistor previously calibrated in order to know the variation thereof as a function of the temperature, the electrical resistor being separated from the enclosure by a medium whose heat conductance is known and one of said parts being made at least partially of a fissile material whilst the other part is made of inert material, measuring said electrical resistor to yield the temperature of the second part and measuring the temperature of the first part of the probe, and establishing from the difference in the temperatures measured at equilibrium between the two parts of the probe and the corresponding value of the heat conductance of the medium, the power continuously released by the part made of fissile material.

2. The process of claim 1, wherein a second electrical resistor, previously calibrated in order to know the variation thereof as a function of the temperature, is electrically connected to the enclosure and offset axially with respect to the fissile material, so that this second resistor is measured to know the temperature of the enclosure.

3. The process of claim 1, wherein the variations in temperature of the enclosure are corrected by associating with the electrical resistor a correction device such as a thermistance, sensitive to the temperature of the enclosure.

4. Apparatus for measuring a neutron flux in accordance with the process of claim 1, comprising:

a probe comprising a first part defining an enclosure, and a second part disposed inside the enclosure and constituted by an electrical resistor, this resistor being separated from the enclosure by a medium whose heat conductance is known, one of said parts being made at least partially of fissile material whilst the other part is made of inert material, and means for measuring the difference in temperatures between the two parts of the probe, these means comprising means for measuring the value of said resistor.

5. The apparatus of claim 4, wherein the enclosure is made of inert material, the second part of the probe being a fissile resistor.

6. The apparatus of claim 4, wherein the inner walls of the enclosure are coated with a foil of fissile material, the second part of the probe being an inert resistor.

7. The apparatus of claim 4, wherein a second inert electrical resistor is electrically connected to the tight enclosure and offset axially with respect to the fissile material, the means for measuring the difference in temperatures between the two parts of the probe further comprising means for measuring the value of the second inert resistor.

8. The apparatus of claim 4, wherein a temperature correction device is electrically connected between the electrical resistor and the enclosure.

9. The apparatus of claim 4, wherein the enclosure is tubular, made of a material which is a good conductor of electricity and closed at one end by a wall and at its other end by a coaxial cable electrically connected to the measuring means, the electrical resistor being filiform, coaxial to the enclosure and electrically connected between the wall and the coaxial cable.

* * * * *